United States Patent
Yanai et al.

(10) Patent No.: US 8,408,622 B2
(45) Date of Patent: Apr. 2, 2013

(54) FRAME MOLDING

(75) Inventors: Toshifumi Yanai, Kariya (JP);
Katsuhiko Takeuchi, Aichi-ken (JP);
Kazunori Kondo, Toyota (JP)

(73) Assignee: Aisin Seiki Kabushiki Kaisha,
Kariya-shi, Aichi-ken (JP)

( * ) Notice: Subject to any disclaimer, the term of this patent is extended or adjusted under 35 U.S.C. 154(b) by 36 days.

(21) Appl. No.: 12/737,923

(22) PCT Filed: Sep. 9, 2009

(86) PCT No.: PCT/JP2009/065709
§ 371 (c)(1),
(2), (4) Date: Mar. 1, 2011

(87) PCT Pub. No.: WO2010/032662
PCT Pub. Date: Mar. 25, 2010

(65) Prior Publication Data
US 2011/0187141 A1 Aug. 4, 2011

(30) Foreign Application Priority Data

Sep. 19, 2008 (JP) .................. 2008-241005
Sep. 26, 2008 (JP) .................. 2008-248495

(51) Int. Cl.
*B60J 10/02* (2006.01)
(52) U.S. Cl. .................. 296/1.08; 296/146.9; 52/716.5
(58) Field of Classification Search ............ 296/1.08, 296/93, 146.2, 146.9; 49/490.1; 52/716.5, 52/716.7
See application file for complete search history.

(56) References Cited

U.S. PATENT DOCUMENTS

| 4,278,286 A | 7/1981 | Kiba et al. |
| 5,275,455 A | 1/1994 | Harney et al. |
| 7,076,919 B2 | 7/2006 | Katakura et al. |
| 7,452,022 B2 * | 11/2008 | Sato et al. .................. 296/93 |
| 2004/0245803 A1 | 12/2004 | Katakura et al. |
| 2006/0255626 A1* | 11/2006 | Asbury .................. 296/214 |

FOREIGN PATENT DOCUMENTS

| JP | 52-84119 | 6/1977 |
| JP | 52-91913 | 7/1977 |
| JP | 3-100548 | 10/1991 |
| JP | 5-32042 | 4/1993 |
| JP | 5-185880 | 7/1993 |
| JP | 10-44776 | 2/1998 |
| JP | 2001-206067 | 7/2001 |
| JP | 2004-210041 | 7/2004 |
| JP | 2007-210480 | 8/2007 |

OTHER PUBLICATIONS

International Search Report.
Australian Office Action for AU Appl. No. 2009293829 dated Oct. 27, 2011.
Japanese Office Action for JP Appl. No. 2008-248495 dated Oct. 30, 2012.

* cited by examiner

*Primary Examiner* — Glenn Dayoan
*Assistant Examiner* — Jason S Daniels
(74) *Attorney, Agent, or Firm* — Finnegan, Henderson, Farabow, Garrett & Dunner, LLP

(57) ABSTRACT

A frame molding is provided. The frame molding includes a frame molding main body having first claws and a holder member assembled with the frame molding main body. A holder member includes a metal holder portion and a resin holder portion fixed to the metal holder portion. The resin holder has receiving portions that are crimped by the claws.

10 Claims, 7 Drawing Sheets

FRAME MOLDING

FIELD OF THE INVENTION

The present invention relates to a frame molding for attaching to the periphery of a vehicle door.

BACKGROUND OF THE INVENTION

For example, Patent Document 1 discloses a structure for attaching an ornamental molding, which is a frame molding, to a vehicle door. According to Patent Document 1, an ornamental molding is attached to a vehicle door via an attachment plate. The attachment plate extends upward from the upper end of a door panel extending rearward from a door frame.

FIG. 12 shows a lower molding 116, which is a frame molding, disclosed in Patent Document 2. As shown in FIG. 12, the lower molding 116 includes a channel portion 108 and an outside portion 109 having an ornamental surface 109a. The channel portion 108 and the outside portion 109 are formed separately as different members. The lower molding 116 is secured to a door frame 101 with a plurality of fasteners, such as rivets, arranged along the longitudinal direction of the lower molding 116. The outside portion 109 has a raised portion 111, which has a shape corresponding with the shape of the door frame 101 and the space between the door frame 101 and a body panel 102. The raised portion 111 is formed by bending the outside portion 109. A flange portion 111b extending from a side wall 111a of the raised portion 111 and the channel portion 108 are fixed to an attachment portion 107 of the door frame 101.

Patent Document 3 discloses a molding for a vehicle, in which an ornamental band is assembled into a recess formed in the surface of the main body. The ornamental band has crimp claws. The crimp claws are inserted into slits formed in the recess and bent at the proximal ends, so that the band is fixed to the main body of the molding.

PRIOR ART DOCUMENTS

Patent Documents

Patent Document 1: Japanese Laid-Open Patent Publication No. 2007-210480
Patent Document 2: Japanese Laid-Open Patent Publication No. 2001-206067
Patent Document 3: Japanese Laid-Open Utility Model Publication No. 3-100548

SUMMARY OF THE INVENTION

Problems that the Invention is to Solve

Although not specified in Patent Document 1, an ornamental molding is typically fixed to an attachment plate with rivets or by spot welding. Thus, the ornamental molding has a bearing surface to which rivets are attached or spot welding is applied. The bearing surface needs to project from the ornamental molding, which has a wide ornamental surface. This increases the number of processing steps for the ornamental molding pressing. This, in turn, increases the possibility of damaging the ornamental surface, and raises the number of defective products.

According to Patent Document 2, the raised portion 111 is formed by bending the outside portion 109, so as to extend over the entire length of the molding. However, bending of the outside portion 109 creates deformation that appears on the ornamental surface 109a. This deteriorates the appearance of the lower molding 116.

According to Patent Document 3, the crimp claws are bent at the proximal ends to fix the ornamental band to the molding main body. Therefore, if the length from the ornamental surface of the ornamental band to the distal end of the crimp claws is short, bending of the claws at the proximal ends creates deformation, which deteriorates the appearance of the ornamental surface.

It is a first objective of the present invention to provide a frame molding that prevents an ornamental surface from being damaged and is inexpensive.

It is a second objective of the present invention to provide a frame molding that reduces deformation appearing on an ornamental surface, improves the appearance of the ornamental surface, and increases yield.

Means for Solving the Problems

To achieve the above objective and in accordance with one aspect of the present invention, a frame molding is provided. The frame molding includes a frame molding main body having a claw and a holder member assembled with the frame molding main body. A holder member includes a metal holder and a resin holder fixed to the metal holder. The resin holder has a receiving portion that is crimped by the claw.

In the above configuration, the holder member is formed by the metal holder and the resin holder. The resin holder has a crimp receiving portion. A crimp claw is built into the frame molding main body of the holder member to correspond to the crimp receiving portion. The crimp claw is crimped in the crimp receiving portion so as to assemble the holder main body to the frame molding main body. Therefore, unlike the conventional art, fastening by welding or rivets is not required. This significantly reduces the number of processing steps for pressing of the frame molding and reduces the number of connecting parts. The reduction in the number of steps for pressing reduces the possibility of damage to the ornamental surface in each step. Also, the reduction in the pressing processes and the number of connecting parts lowers cost for the frame molding.

The resin holder is preferably insert molded so as to be integrated with the metal holder.

This further reduces the number of components for connecting the resin holder to the metal holder.

The metal holder preferably has a flange that is formed by bending a plate, and the flange is preferably located in the resin holder.

Accordingly, the corner portion, at which the plate is bent, enhances close contact between the resin holder and the metal holder, increasing yield for the frame molding.

The flange preferably has a plurality of through holes arranged along the longitudinal direction thereof.

Accordingly, the corner portion, at which the plate is bent, and the through holes enhance close contact between the resin holder and the metal holder. Also, during insert molding, the through holes allow resin to smoothly flow to the surfaces of the metal holder. The improvement of the flowability for resin material and the enhanced close contact raises the yield for the frame molding.

The resin holder preferably has a fastening portion to which a weather strip is fastened.

This configuration allows the weather strip to be attached to the resin holder without providing additional attachment parts, reducing cost for the frame molding.

The receiving portion is preferably provided to protrude from the resin holder. The claw is provided to protrude from an end face of the frame molding main body. With the receiving portion positionally corresponding to the claw, the distal end of the receiving portion protrudes further than the end face. The claw is bent at an angle greater than 90 degrees to cover the receiving portion, so as to contact the resin holder.

According to this configuration, the deformation created by bending of the claw does not influence the ornamental surface of the frame molding main body. This improves the appearance of the ornamental surface. As the appearance of the ornamental surface is improved, the yield for the frame molding is increased.

The receiving portion preferably has an inclined surface that extends from the distal end toward an ornamental surface of the frame molding main body.

This causes the holder member to receive force acting in a direction toward a predetermined position in the frame molding main body. Thus, with the crimping action of the claw, the holder member is easily and reliably moved to the predetermined position along the frame molding main body.

The frame molding main body preferably includes an ornamental surface and a side wall that is bent relative thereto and extends from the ornamental surface. The claw extends from the end face of the side wall. With the resin holder located on the inner surface of the frame molding main body at a position opposite to the ornamental surface, the resin holder is moved toward and contacts the side wall along the inner surface as the receiving portion is crimped by the claw.

According to this configuration, the position of the resin holder is accurately determined with respect to the frame molding main body.

The claw is a first claw, and the receiving portion is a first receiving portion. The frame molding main body has a second claw at a position opposite to the first claw. The resin holder has a second receiving portion that corresponds to the second claw.

According to this, the rear molding can be attached to the vehicle door with the position of the ornamental surface accurately determined with respect to the vehicle door.

The metal holder is preferably made of stainless steel, and the resin holder is preferably made of fiberglass-reinforced polypropylene.

According to this, the resin holder can be easily formed integrally with the metal holder. Also, the strength of the resin holder is improved.

A frame molding preferably includes a holder member having a metal holder and a resin holder, and a frame molding main body. A receiving portion is arranged to protrude from the resin holder. The claw is arranged to protrude from an end face of the frame molding main body. A distal end of the receiving portion protrudes from the end face with the receiving portion positionally corresponding to the claw. The claw is bent by an angle greater than 90 degrees to cover the receiving portion, so as to contact the resin holder.

According to this configuration, the deformation created by bending of the claw does not influence the ornamental surface of the frame molding main body. This improves the appearance of the ornamental surface. As the appearance of the ornamental surface is improved, the yield of the frame molding is increased.

DETAILED DESCRIPTION OF THE PREFERRED EMBODIMENTS

Figure 1:
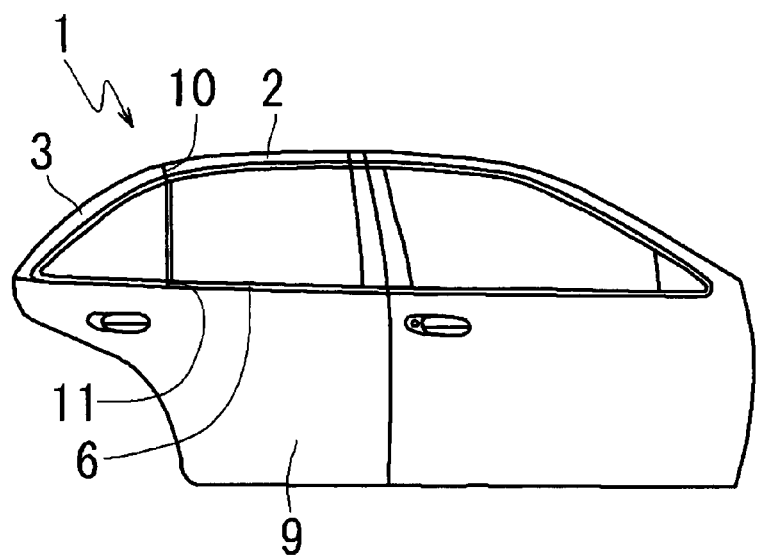
[FIG. 1] A partial side view of a vehicle provided with a door molding according to one embodiment of the present invention.
Figure 2:
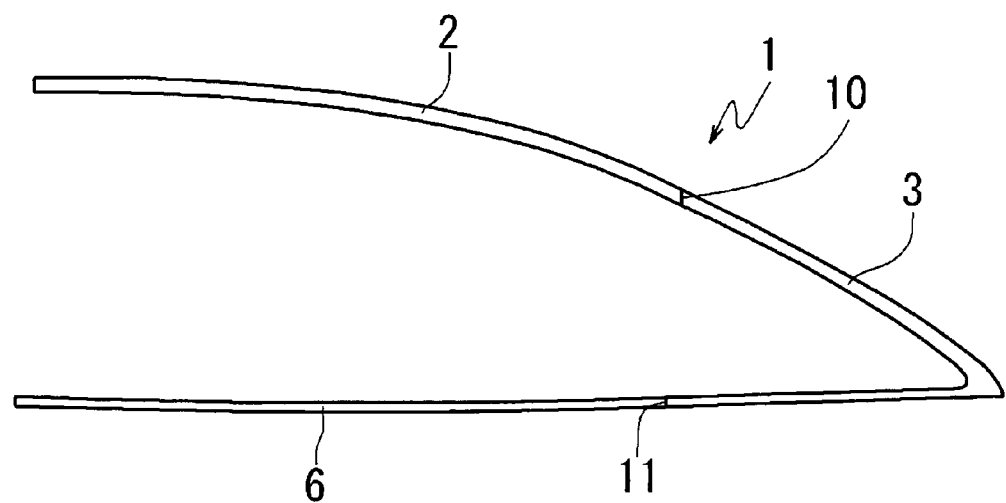
[FIG. 2] A schematic diagram of the door molding of FIG. 1.

One embodiment of the present invention will now be described with reference to FIGS. 1 to 11. FIG. 1 shows a part of a vehicle provided with a door molding 1 according to one embodiment of the present invention. FIG. 2 is a diagram showing the door molding 1 of FIG. 1 provided at the rear right door, as viewed from inside of the vehicle.

As shown in FIGS. 1 and 2, the door molding 1 includes an upper molding 2 (frame molding), a rear molding 3 (a frame molding), and a lower molding 6 (frame molding). The upper molding 2 and the rear molding 3 are connected to each other at a connection portion 10, and the rear molding 3 and the lower molding 6 are connected to each other at a connection portion 11. The main body of the upper molding 2 and the main body of the lower molding 6 are curved with a relatively large radius of curvature. The main body of the upper molding 2 and the main body of the lower molding 6 are formed, for example, by rolling. A main body 13 of the rear molding 3, or a rear molding main body 13 (see FIG. 6) is curved along the window frame of a rear portion of the door, and is formed by pressing. The door molding 1 is a garnish for ornamentation of the periphery of a door 9.

Figure 3:
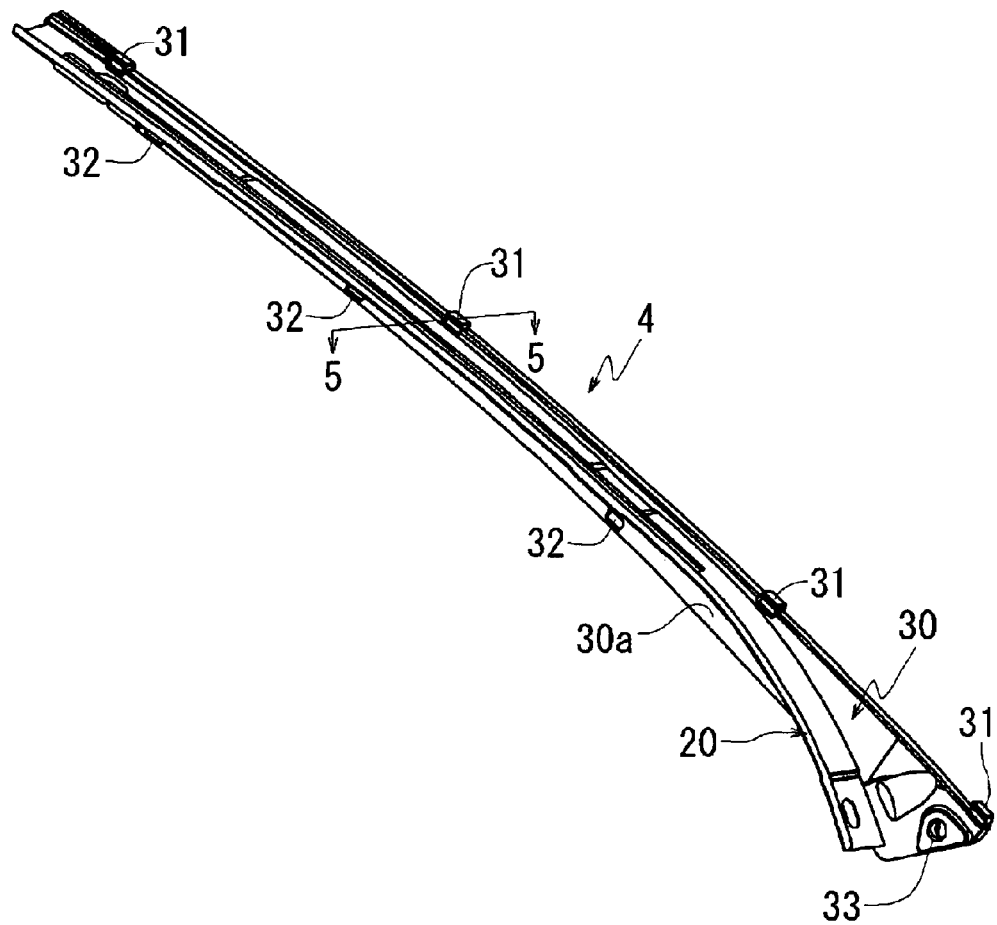
[FIG. 3] A perspective view showing a holder member of a rear molding that forms a part of the door molding shown in FIG. 1.
Figure 5:
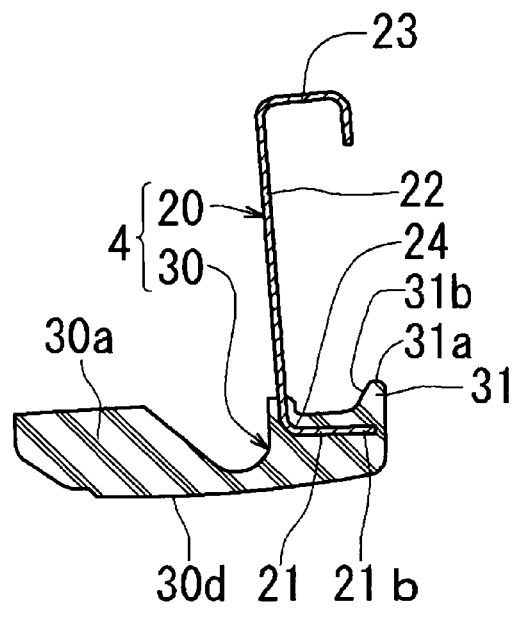
[FIG. 5] A cross-sectional view taken along line 5-5 in FIG. 3.

FIG. 3 is a perspective view showing a holder member 4 of the rear molding 3. As shown in FIGS. 3 and 5, the holder member 4 includes a metal holder portion 20 (a metal holder) and a resin holder portion 30 (a resin holder). The metal holder portion 20 is formed, for example, of stainless steel. The resin holder portion 30 is formed by insert molding so as to be integrated with the metal holder portion 20.

Figure 4:
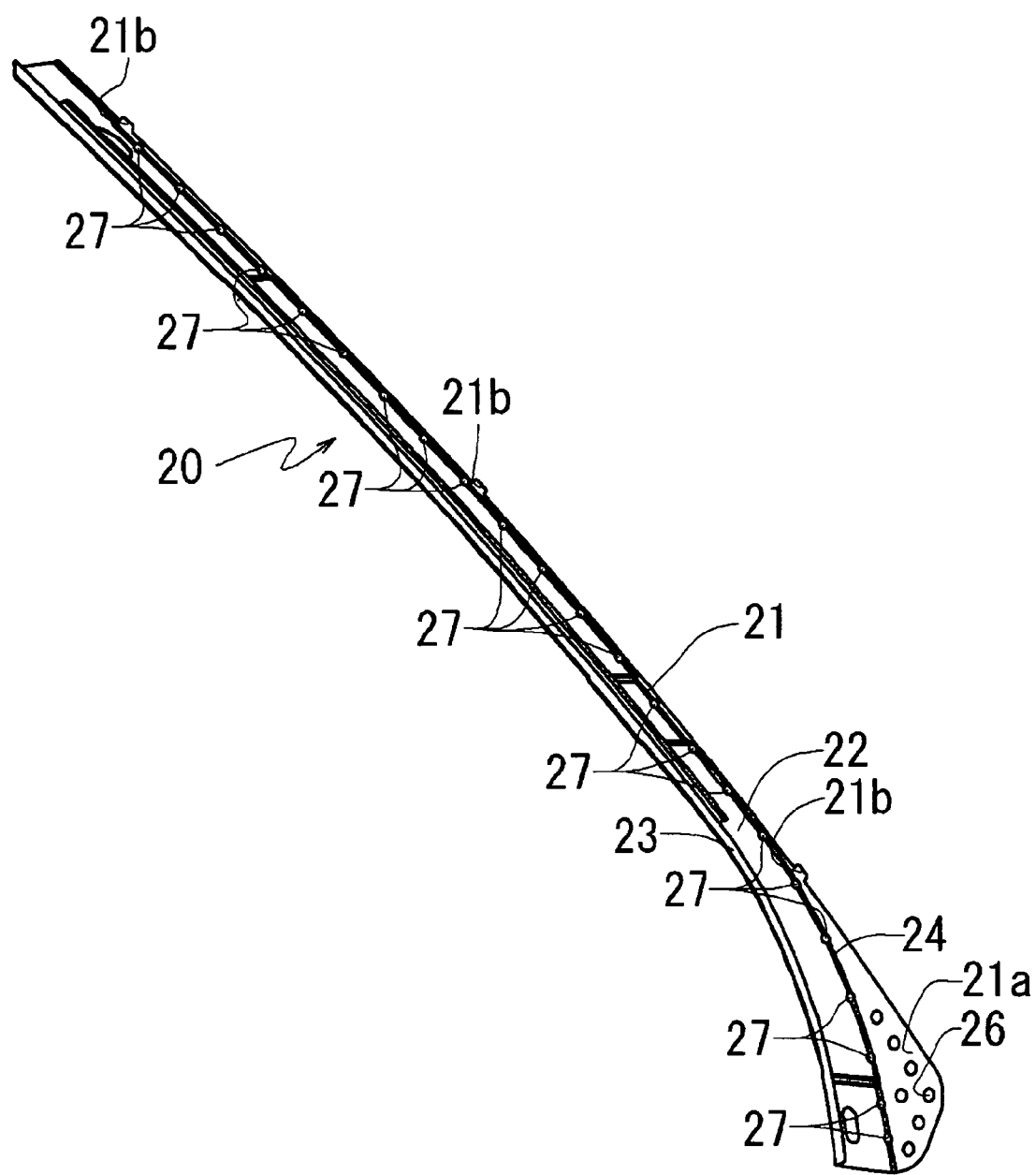
[FIG. 4] A perspective view of a metal holder of the holder member shown in FIG. 3.

FIG. 4 is a perspective view of the metal holder portion 20. As shown in FIGS. 4 and 5, the metal holder portion 20 has a substantially channel shaped cross section, and is formed by pressing a stainless steel plate. The metal holder portion 20 includes a flange 21, a belt 22 bent at a right angle relative to the flange 21, and an angle 23 bent at a right angle relative to the belt 22. The flange 21 has a sectoral portion 21a at one end in the longitudinal direction, and a plurality of protrusions 21b protruding from one side surface of the flange 21. Seven through holes 26 are formed at predetermined intervals in the sectoral portion 21a. In a corner portion 24, which is a bent part between the flange 21 and the belt 22, twenty-three through holes 27 are formed at predetermined intervals along the entire length. The through holes 27 formed in the corner portion 24 are smaller than the through holes 26. To inhibit rust, stainless steel (SUS) is used as the material for the metal holder portion 20. However, any metal other than stainless steel that has rust inhibiting properties or has been subjected to a rust proofing treatment may be used.

FIG. 5 is a cross-sectional view taken along line 5-5 of FIG. 3. As shown in FIG. 5, the resin holder portion 30 encompasses the flange 21 of the metal holder portion 20, and has an extended portion 30a located on the opposite side of the flange 21 with respect to the corner portion 24. The resin holder portion 30 is formed by insert molding so as to be integrated with the metal holder portion 20. When the resin holder portion 30 is insert molded, resin flows from the side corresponding to the angle 23 toward the flange 21, then flows through the through holes 26 of the sectoral portion 21a (see FIG. 4) and the through holes 27 of the corner portion 24 (see FIG. 4). The resin then flows out from the opposite side of the flange 21 with respect to the angle 23. The through holes 26, 27, and the corner portion 24 enhances close contact between the resin holder portion 30 and the metal holder portion 20.

As shown in FIG. 3, the resin holder portion 30 has first receiving portions 31 at positions corresponding to the protrusions 21b of the metal holder portion 20 (see FIG. 4) and corners of the sectoral portion 21a (FIG. 4). As shown in FIG. 5, each of the first receiving portions 31 has a distal end 31a, a bottom surface 30d, and an inclined surface 31b extending from the distal end 31a to the bottom surface 30d. Also, as shown in FIG. 3, the resin holder portion 30 has second receiving portions 32 at the extended portion 30a.

The resin holder portion 30 is made of resin material such as fiberglass-reinforced polypropylene (PPGF) or polypropylene (PP). Taking strength into consideration, it is preferable to use a fiberglass-reinforced polypropylene formed by impregnating glass fiber with 30% polypropylene. Alternatively, the resin holder portion 30 may be made of a resin material that is formed by impregnating resin such as epoxy with fine powder of, for example, alumina.

Figure 6:
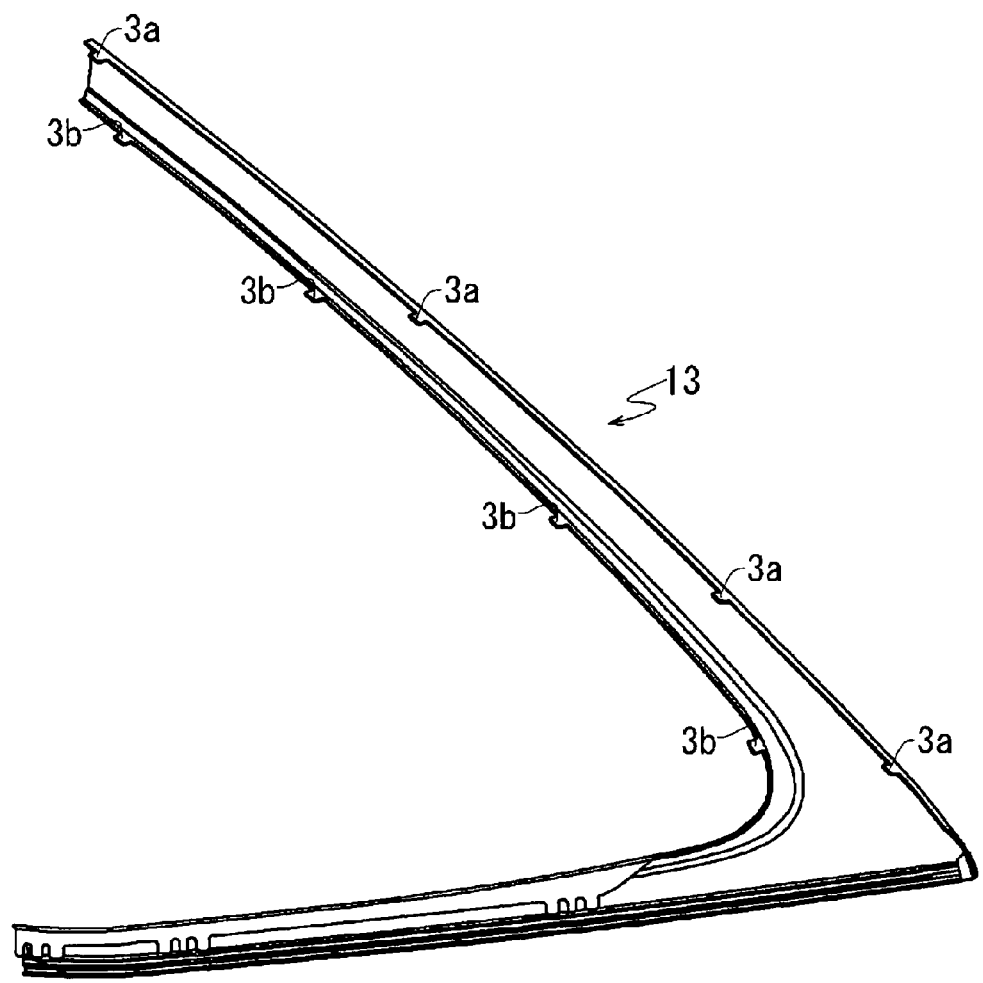
[FIG. 6] A perspective view of the rear molding main body according to the present embodiment.
Figure 7:
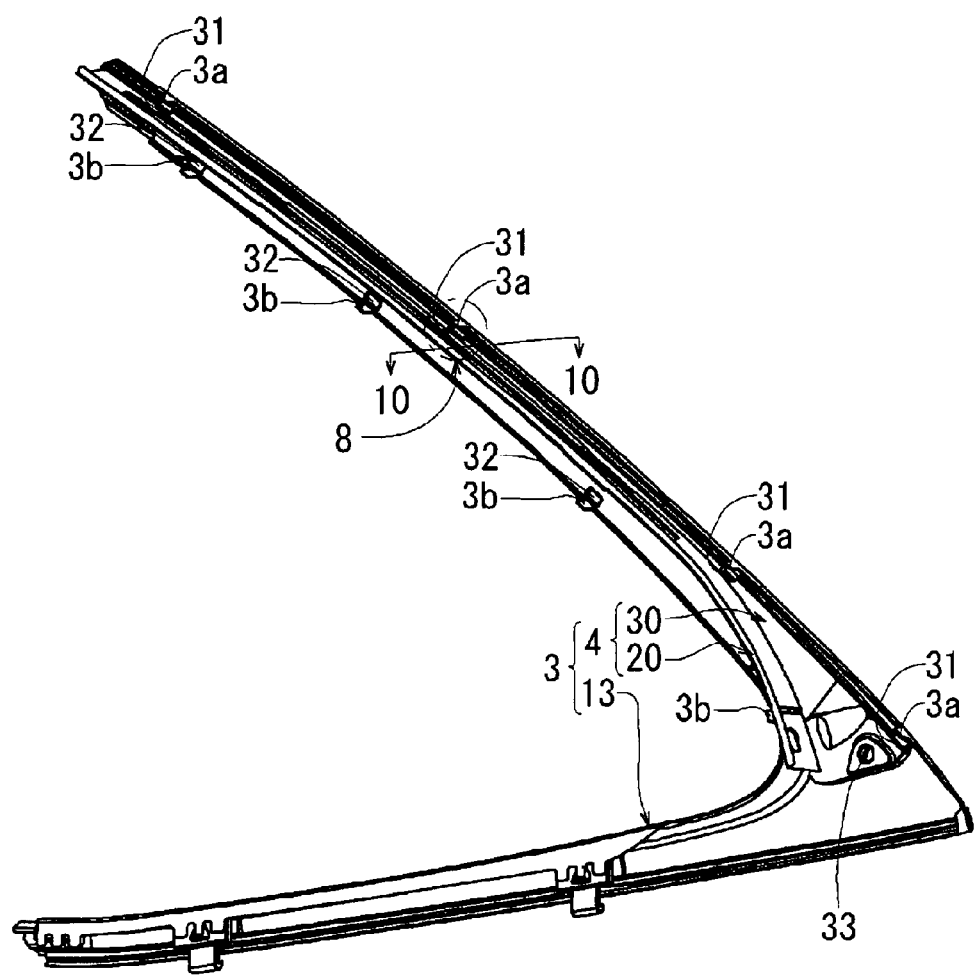
[FIG. 7] A perspective view of the rear molding according to the present embodiment.

FIG. 6 is a perspective view of the rear molding main body 13, or an ornamental component, made of stainless steel. FIG. 7 is a perspective view of the rear molding 3. As shown in FIG. 7, the rear molding 3 includes the rear molding main body 13 (the frame molding main body) and the holder member 4.

Figure 8:
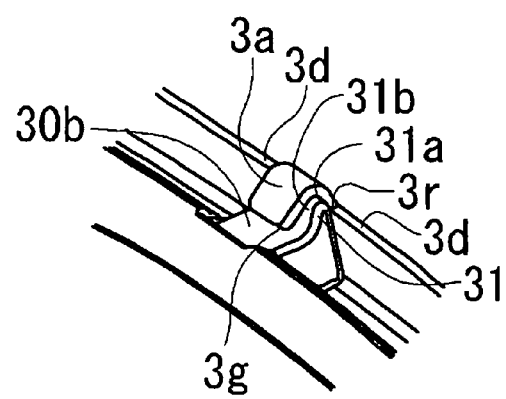
[FIG. 8] An enlarged perspective view of a part 8 in FIG. 7.
Figure 9:
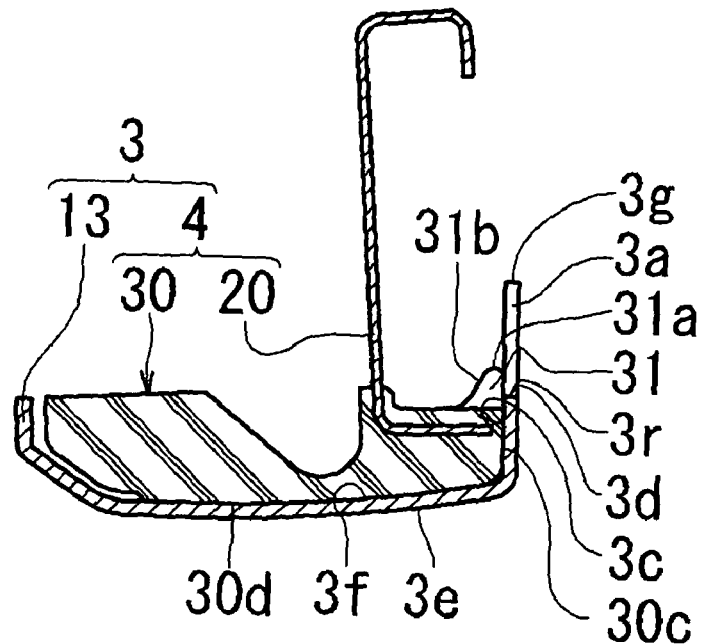
[FIG. 9] An enlarged cross-sectional view taken along line 10-10 of FIG. 7, illustrating a state in which a first claw crimps a first receiving portion.
Figure 10:
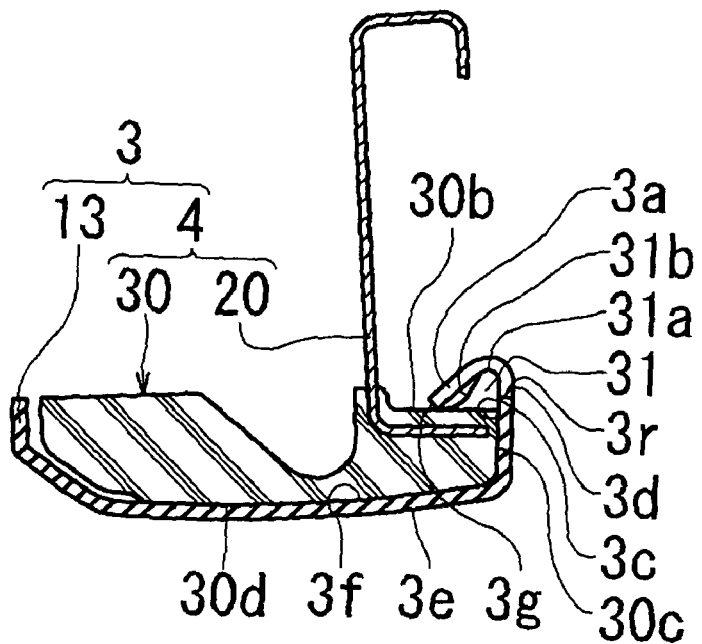
[FIG. 10] An enlarged cross-sectional view taken along line 10-10 of FIG. 7.

FIG. 8 is an enlarged perspective view of a part 8 of the rear molding 3 shown in FIG. 7. FIG. 10 is an enlarged cross-sectional view taken along line 10-10 of FIG. 7, showing a state in which the rear molding main body 13 is fixed to the holder member 4. FIG. 9 is a cross-sectional view corresponding to FIG. 10, showing a state in which the rear molding main body 13 has not been fixed to the holder member 4. The rear molding main body 13 has a side wall 3c and an ornamental surface 3e. The side wall 3c is bent relative to and extends from the ornamental surface 3e. As shown in FIGS. 6 to 8, first claws 3a are provided on the side wall 3c at positions corresponding to the first receiving portions 31 of the resin holder portion 30. The first claws 3a extend so as to protrude from an end face 3d of the side wall 3c. As shown in FIGS. 8 to 10, each first claw 3a of the rear molding main body 13 is bent to cover the corresponding first receiving portion 31 of the resin holder portion 30, so that the first claw 3a contacts and crimp the resin holder portion 30. Specifically, with the holder member 4 built into the rear molding main body 13 as shown in FIG. 9, the distal end 31a of the first receiving portion 31 protrudes from the end face 3d of the side wall 3c of the rear molding main body 13. The proximal end 3r of the first claw 3a is located at the end face 3d. As described above, the inclined surface of each first receiving portion 31 extends diagonally downward from the distal end 31a of the first receiving portion 31 to the bottom surface 30d of the resin holder portion 30, that is, toward the ornamental surface 3e of the rear molding main body 13. The length of the first claws 3a is determined such that, when bent at an angle greater than 90 degrees, the first claws 3a contact at least part of the inclined surface 31b. As shown in FIG. 10, the length of the first claws 3a is determined such that the bent first claws 3a contact at least part of the inclined surface 31b, and distal ends 3g of the first claws 3a contact a surface 30b of the resin holder portion 30. The part of each first claw 3a at which it is bent is located higher than the proximal end 3r thereof, that is, higher than the end face 3d.

Also, as shown in FIGS. 6 and 7, the rear molding main body 13 has second claws 3b at positions corresponding to the second receiving portions 32 of the resin holder portion 30. Specifically, each second claw 3b is bent to cover the corresponding second receiving portion 32, so as to contact the second receiving portion 32. This prevents the holder member 4 from separating from the rear molding main body 13. However, the holder member 4 is slidable along an inner surface 3f of the rear molding main body 13 (see FIG. 9) toward the inside surface of the side wall 3c of the rear molding main body 13 (see FIG. 9). Therefore, as the first receiving portions 31 of the resin holder portion 30 are crimped with the first claws 3a, the holder member 4 is slid relative to the rear molding main body 13, so that the side surface 30c of the resin holder portion 30 contacts the inside surface of the side wall 3c of the rear molding main body 13. In this manner, the rear molding main body 13 is assembled with the holder member 4 to form the rear molding 3.

Figure 11:
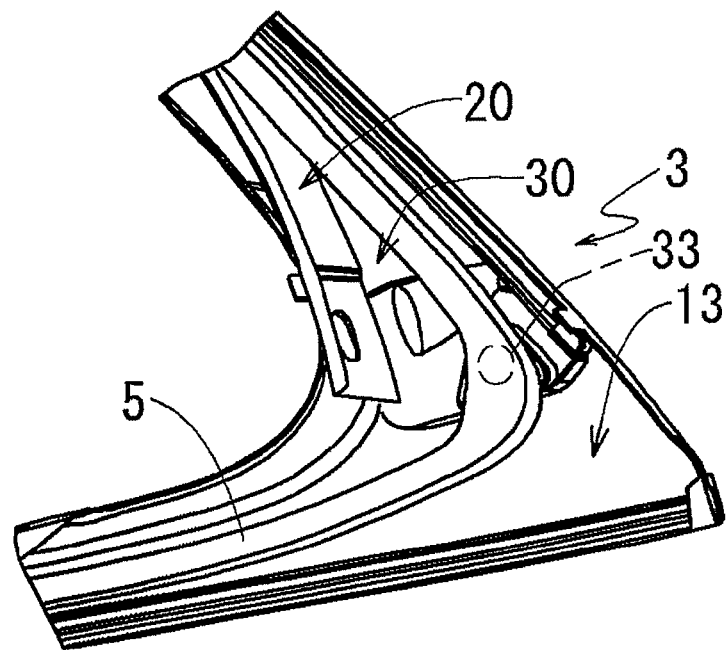
[FIG. 11] A partial perspective view of the rear molding to which a weather strip is attached.
Figure 12:
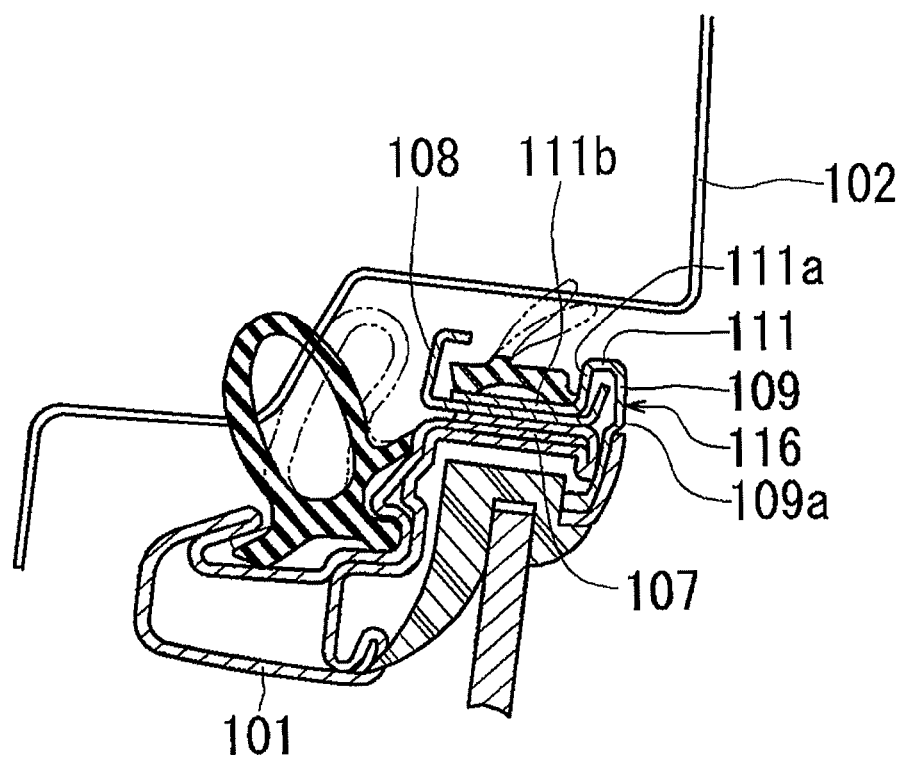
[FIG. 12] A cross-sectional view illustrating a conventional door frame molding.

FIG. 11 is a partial perspective view of the rear molding 3 to which a weather strip 5 is attached. As shown in FIG. 11, the resin holder portion 30 has an attachment hole 33 (fastening portion) at a position close to the sectoral portion 21a (FIG. 5). The weather strip 5 is attached to the resin holder portion 30 via the attachment hole 33.

The present embodiment provides the following advantages. That is, the holder member 4 includes the metal holder portion 20 and the resin holder portion 30, which is insert molded to be integrated with the metal holder portion 20. The resin holder portion 30, which is integrated with the metal holder portion 20, has the first receiving portions 31 and the second receiving portions 32. The rear molding main body 13 is built into the holder member 4 such that the first claws 3a and the second claws 3b of the rear molding main body 13 are at positions corresponding to the first receiving portions 31 and the second receiving portions 32 of the resin holder portion 30. Then, the first claws 3a are bent to crimp the first receiving portions 31. Also, the second claws 3b are bent to contact the second receiving portions 32, so as to prevent the holder member 4 from separating from the rear molding main body 13. Since the first claws 3a are fixed to the first receiving portions 31 by crimping and the second claws 3b are brought into contact with the second receiving portions 32, the rear molding main body 13 can be secured to the holder member 4 without welding or rivets, unlike the conventional art. Therefore, the number of processing steps for the pressing of the rear molding 3 is significantly reduced, and the number of components required for securing the rear molding main body 13 to the holder member 4 is reduced. Accordingly, costs are reduced. The reduction in the number of steps for pressing minimizes the possibility of damage to the ornamental surface 3e in each step.

The metal holder portion 20 of the holder member 4 is formed by bending (pressing) a plate, and has a channel shaped cross section. Since the corner portion 24 of the metal holder portion 20 is embedded in the resin holder portion 30 by the insert molding, close contact between the resin holder portion 30 and the metal holder portion 20 is enhanced. Further, resin enters the through holes 26 formed in the flange 21 and the through holes 27 formed at predetermined intervals along the entire length of the flange 21, so that close contact between the resin holder portion 30 and the metal holder portion 20 is enhanced further. Also, during insert molding, the through holes 26, 27 improve the flowability of the resin, so that the resin smoothly flows to all surfaces of the metal holder portion 20. The improvement of the flowability of resin material and the enhanced close contact raise the yield for the rear molding 3.

Further, the resin holder portion 30 has the attachment hole 33 to which the weather strip 5 is fastened. Therefore, the weather strip 5 can be attached to the resin holder portion 30 without providing additional attachment parts. This reduces cost for the rear molding 3.

The first claws 3a of the rear molding main body 13 are bent at an angle greater than 90 degrees so as to cover the first receiving portions 31 of the resin holder portion 30. Accordingly, the first claws 3a contact the surface 30b of the resin holder portion 30 to crimp the first receiving portions 31. In this case, the bend radius is adjusted such that the bent position of the first claw 3a is located higher than the proximal end 3r of the first claw 3a. Such adjustment of the bend radius of the first claws 3a and the protruding of the distal ends 31a of the first receiving portions 31 from the end face 3d of the side wall 3c of the rear molding main body 13 prevent deformation created by bending of the first claws 3a from influencing the ornamental surface 3e of the rear molding main body 13. This improves the appearance of the ornamental surface 3e. As the appearance of the ornamental surface 3e is improved, the yield of the rear molding 3 is increased.

The first claws 3a are bent at an angle greater than 90 degrees so as to crimp the first receiving portions 31, so that the holder member 4 is moved toward the inside surface of the side wall 3c of the rear molding main body 13 along the inner surface 3f of the ornamental surface 3e of the rear molding main body 13. The side surface 30c of the resin holder portion 30 then contacts the inside surface of the side wall 3c. This allows the position of the rear molding main body 13 to be accurately determined with respect to the holder member 4, using the side surface 30c and the bottom surfaces 30d of the resin holder portion 30 as reference planes. As a result, the rear molding 3 can be attached to the vehicle door with the position of the ornamental surface 3e accurately determined with respect to the vehicle door.

Since the first receiving portion 31 has the inclined surface 31b, which extends diagonally toward the ornamental surface 3e of the rear molding main body 13, the first claws 3a are caused to contact at least part of the inclined surface 31b when the first claws 3a are bent at an angle greater than 90 degrees. This causes the holder member 4 to receive force acting in a direction toward the side wall 3c of the rear molding main body 13. Therefore, through the crimping action of the first claws 3a, the holder member 4 is easily and reliably moved toward the side wall 3c along the inner surface 3f of the rear molding main body 13.

Further, since the distal ends 3g of the first claws 3a are caused to contact the resin holder portion 30, which is continuous with the inclined surface 31b, the holder member 4 receives force from the distal ends 3g of the first claws 3a. This force prevents the holder member 4 from separating from the rear molding main body 13, and moves the holder member 4 toward the side wall 3c of the rear molding main body 13 more reliably.

Although the rear molding 3 has been described in the present embodiment so far, the present invention may be applied to the upper molding 2, the lower molding 6, or any other fame molding.

Although the holder member 4 of the illustrated embodiment is formed by the metal holder portion 20 and the resin holder portion 30, the holder member 4 may be formed only by the resin holder portion 30.

DESCRIPTION OF REFERENCE CODES

2 . . . Upper molding (frame molding), 3 . . . Rear molding (frame molding), 3a . . . First crimp claws, 4 . . . Holder member, 6 . . . Lower molding (frame molding), 13 . . . Rear molding main body (frame molding main body), 20 . . . Meal holder portion (metal holder), 21 . . . Flange, 26, 27 . . . Through holes, 30 . . . Resin holder portion (resin holder), 31 . . . First receiving portions, 33 . . . Attachment hole (fastening portion), 32 . . . Second receiving portions.

The invention claimed is:

1. A frame molding comprising:
a frame molding main body having a claw; and
a holder member having a metal holder and a resin holder fixed to the metal holder, the holder member being assembled with the frame molding main body,
the resin holder having a receiving portion that is crimped by the claw,
wherein: the receiving portion is arranged to protrude from the resin holder; the claw is arranged to protrude from an end face of the frame molding main body; a distal end of the receiving portion protrudes from the end face of the frame molding main body with the receiving portion positionally corresponding to the claw; and the claw is bent by an angle greater than 90 degrees to cover the receiving portion, so as to contact the resin holder,
wherein the receiving portion has an inclined surface that extends from the distal end toward an ornamental surface of the frame molding main body,
wherein a portion of the inclined surface far from the ornamental surface is located at an edge of the ornamental surface, and a portion of the inclined surface close to the ornamental surface is located between edges of the ornamental surface.

2. The frame molding according to claim 1, wherein the resin holder is insert molded so as to be integrated with the metal holder.

3. The frame molding according to claim 1, wherein the metal holder has a flange that is formed by bending a plate, the flange being located in the resin holder.

4. The frame molding according to claim 3, wherein the flange has a plurality of through holes arranged along the longitudinal direction thereof.

5. The frame molding according to claim 1, wherein the resin holder has a fastening portion to which a weather strip is fastened.

6. The frame molding according to claim 1, wherein the frame molding main body includes an ornamental surface; and a side wall that is bent relative to and extends from the ornamental surface, the claw extending to protrude from an end face of the side wall, and
wherein, with the resin holder located on an inner surface of the frame molding main body at a position opposite to the ornamental surface, the resin holder is moved toward and contacts the side all along the inner surface as the receiving portion is crimped by the claw.

7. The frame molding according to claim 1, wherein:
the claw is a first claw, and the receiving portion is a first receiving portion;
the frame molding main body has a second claw at a position opposite to the first claw, the resin holder having a second receiving portion that corresponds to the second claw; and
the second claw is bent to contact the resin holder, so as to prevent the resin holder from separating from the frame molding main body, and allowing the resin holder to slide along the frame molding main body.

8. The frame molding according to claim 1, wherein the metal holder is made of stainless steel, and the resin holder is made of fiberglass-reinforced polypropylene.

9. A frame molding comprising a holder member having a metal holder and a resin holder, and a frame molding main body,
wherein: a receiving portion is arranged to protrude from the resin holder; a claw is arranged to protrude from an end face of the frame molding main body; a distal end of the receiving portion protrudes from the end face of the frame molding main body with the receiving portion positionally corresponding to the claw; and the claw is bent by an angle greater than 90 degrees to cover the receiving portion, so as to contact the resin holder,
wherein the receiving portion has an inclined surface that extends from the distal end toward an ornamental surface of the frame molding main body,
wherein a portion of the inclined surface far from the ornamental surface is located at an edge of the ornamental surface, and a portion of the inclined surface close to the ornamental surface is located between edges of the ornamental surface.

10. The frame molding according to claim 1, wherein the frame molding main body has a channel shaped cross section.

* * * * *